US010751932B2

(12) United States Patent
Rudolph et al.

(10) Patent No.: US 10,751,932 B2
(45) Date of Patent: Aug. 25, 2020

(54) JOINT STRUCTURES

(71) Applicant: Wisconsin Alumni Research Foundation, Madison, WI (US)

(72) Inventors: Natalie Margaretha Rudolph, Madison, WI (US); Alec James Redmann, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 315 days.

(21) Appl. No.: 15/656,401

(22) Filed: Jul. 21, 2017

(65) Prior Publication Data

US 2019/0022925 A1  Jan. 24, 2019

(51) Int. Cl.
*B29C 64/10* (2017.01)
*B29C 65/52* (2006.01)
*B33Y 10/00* (2015.01)
*B29C 65/00* (2006.01)
*B33Y 30/00* (2015.01)
(Continued)

(52) U.S. Cl.
CPC ............ *B29C 64/10* (2017.08); *B29C 65/526* (2013.01); *B29C 66/73753* (2013.01); *B29C 66/73754* (2013.01); *B33Y 10/00* (2014.12); *B29C 65/02* (2013.01); *B29C 66/1122* (2013.01); *B29C 66/12441* (2013.01); *B29C 66/43441* (2013.01); *B29C 66/474* (2013.01); *B29C 66/5326* (2013.01); *B29C 66/721* (2013.01); *B29C 66/7252* (2013.01); *B29C 66/7394* (2013.01); *B29C 66/73941* (2013.01); *B33Y 30/00* (2014.12); *B33Y 80/00* (2014.12)

(58) Field of Classification Search
CPC ....... B29C 65/483; B29C 65/70; B29C 65/72; B29C 64/10–135
See application file for complete search history.

(56) References Cited

U.S. PATENT DOCUMENTS

| | | | |
|---|---|---|---|
| 6,374,570 B1 * | 4/2002 | McKague, Jr. | ......... B29C 65/56 52/762 |
| 6,849,150 B1 * | 2/2005 | Schmidt | .............. B29C 65/5085 156/285 |
| 9,205,601 B2 | 12/2015 | DeSimone et al. | |

(Continued)

OTHER PUBLICATIONS

Garcia, R., and P. Prabhakar. "Bond interface design for single lap joints using polymeric additive manufacturing." Composite Structures 176 (May 31, 2017): 547-555. (Year: 2017).*

(Continued)

*Primary Examiner* — Benjamin A Schiffman
(74) *Attorney, Agent, or Firm* — Crawford Maunu PLLC

(57) ABSTRACT

Aspects of the present disclosure are directed to a three-dimensional joint and/or formation thereof, such as by 3D-printing the joint. The joint is provided with an interface region having a curable material in a curable state. The joint is positioned with the interface region in contact with a joinable member, and the interface region is cured to form a bond between the joint and the joinable member. Such an approach may, for example, involve forming a mechanical and/or chemical bond with the joint. Further, by utilizing such a joint (e.g., in a 3D-printed form), complex structural components can be formed from a curable material that can be partially cured with structures formed therein, and cured further to create the bond.

18 Claims, 6 Drawing Sheets

(51) Int. Cl.
*B29C 65/02* (2006.01)
*B33Y 80/00* (2015.01)

(56) References Cited

U.S. PATENT DOCUMENTS

2010/0068464 A1* 3/2010 Meyer ............... B23K 15/0086
                                                     428/161
2019/0070791 A1* 3/2019 Gunner ................ B29C 70/72
2019/0105852 A1* 4/2019 Hoyle .................. B29C 70/06

OTHER PUBLICATIONS

Kumar, Shanmugam, Brian L. Wardle, and Muhamad F. Arif. "Strength and performance enhancement of bonded joints by spatial tailoring of adhesive compliance via 3D printing." ACS applied materials & interfaces 9.1 (Dec. 14, 2016): 884-891. (Year: 2016).*

George et al., "Hybrid core carbon fiber composite sandwich panels: Fabrication and mechanical response," Composite Structures, 108:696-710 (2014).

Huang et al., "Structural Integrity of Co-Cured Composite Panels," Materials and Manufacturing Processes, 20:739-746 (2005).

Shin et al., "Effects of Manufacturing Parameters on the Tensile Load Bearing Capacity of a Co-Cured Single Lap Joint," Dept. of Mech. Eng. Korea Advanced Inst. of Sci and Tech, ID-1515.

Tumbleston et al., "Continuous liquid interface production of 3D objects," Science, 347(6228): 1349-1352 (Mar. 20, 2015; Corrected Mar. 23, 2015).

Trask et al., "Influence of process induced defects on the failure of composite T-joint specimens," Composites: Part A 43:748-757 (2012).

Xu et al., "Mechanical Properties of RTM-made Composite Cross-joints," Chinese J. of Aeronautics, 22(2):211-217 (2009).

* cited by examiner

JOINT STRUCTURES

FIELD

Aspects of various embodiments are directed to structures, such as joint structures, which may be cured to couple with objects.

BACKGROUND

In many manufacturing assemblies, adhesive joining is very common for a variety of different types of materials, including metals, composites such as polymer-composite materials, and others. Such joining can also be carried out with different types of materials. One joining approach involves applying a viscous adhesive that joins respective structures. For instance, viscous adhesive can be applied on cured fiber reinforced composite (FRC) and used to bond the FRC to other structures.

While many joining approaches have been employed for years, they can involve labor-intense manual processes with limited reproducibility. Complex joint geometries such as T-joints can be challenging to fabricate, sometimes requiring numerous fixtures and lengthy manual assembly steps.

These and other matters have presented challenges to joining components, and to the formation of joint structures, for a variety of applications.

SUMMARY

Various example embodiments are directed to joining objects and to the joints themselves, as well as their implementation.

According to an example embodiment, a three-dimensional object is formed by arranging a curable material in a three-dimensional structural form, with the three-dimensional object including an interface region having the curable material in a curable state. The three-dimensional object is positioned with the interface region, in the curable state, in contact with a joinable member. The three-dimensional object is joined to the joinable member by curing the interface region, while the interface region is in contact with the joinable member.

Another embodiment involves 3D-printing a three-dimensional joint having an interface region including a curable material. The three-dimensional joint is positioned with the interface region in contact with a joinable member, and a bond that joins the three-dimensional object to the joinable member is formed by curing the interface region.

In accordance with another embodiment, an apparatus includes a three-dimensional object and a joinable member. The three-dimensional object includes a curable material arranged in a three-dimensional structural form and having an interface region in a curable state. The joinable member is in contact with the interface region and configured and arranged with the curable material to, in response to curing of the curable material, form a bond at the interface region that bonds the three-dimensional object with the joinable member. In this context, the embodiment may involve an apparatus of intermediate-manufacture, which when cured provides a combined structure including the joinable member bonded to the three-dimensional object (e.g., as a joint). For instance, the curable material may be provided as a 3D-printed material in a curable state (and in the three-dimensional structural form), that is configured to form the three-dimensional object in response to the curing. Various embodiments are directed to such a structure in a cured state, with a joint between the joinable member and three-dimensional object exhibiting characteristics of having been co-cured, such as by exhibiting a chemical bond.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which.

Figure 1:
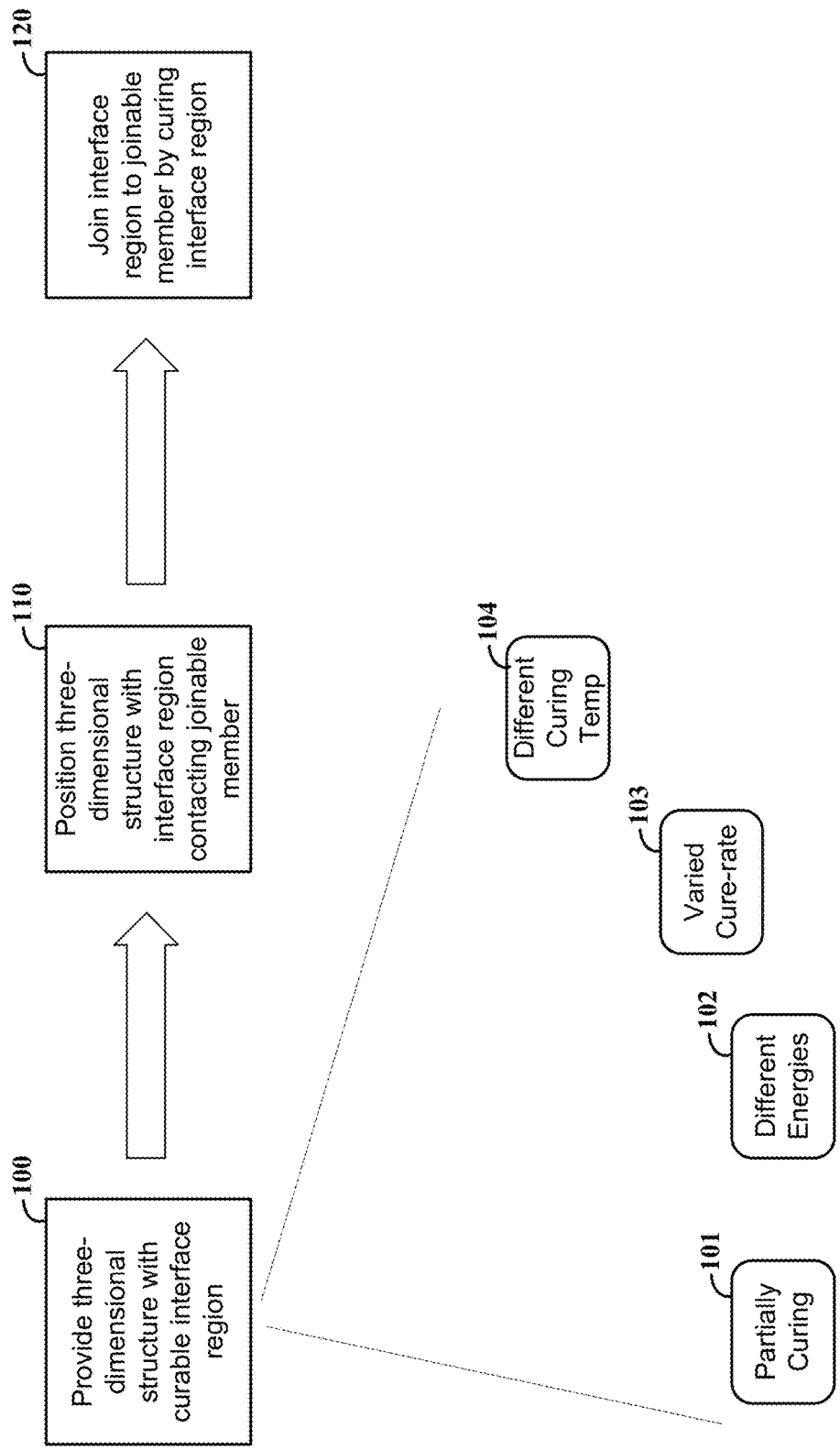
FIG. 1 shows a method, in accordance with an example embodiment.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving joint structures and related methods, and joining thereof via curing of materials. In certain implementations, aspects of the present disclosure have been shown to be beneficial when used in the context of joining curable structures, such as with 3D printing processes and/or others involving the use of structural components to also join with other structures (e.g., mechanically and/or chemically). While not necessarily so limited, various aspects may be appreciated through a discussion of examples using such exemplary contexts.

According to various example embodiments, aspects of the present disclosure are directed to joint structures and to joining structures, in which an uncured (e.g., not fully cured, or partially cured) interface is contacted with another member and subsequently cured/bonded. Certain embodiments involve 3D-printing a joint, which can have complex inner structures and/or surface features, and later fully curing an interface region of the joint to secure the joint to an object or objects. The 3D-printed joint can be partially cured initially, then positioned relative to an object or objects to be joined, and fully cured throughout to solidify the structural components within and also to bond the joint to the object or objects.

Curable material is provided in a variety of manners, as may be implemented with respective embodiments. For instance, a curing process may be interrupted prior to attaining a full cure, such that an interface and/or other portions are not fully cured (e.g., may be partially cured). Different types of materials can also be used to achieve a curable state, such as a partially cured state. For instance, certain materials may cure under similar conditions but at different rates, may cure at different temperatures, may cure in response to different types of energy stimulus, or otherwise cure in a manner such that an interface and/or other region does not fully cure relative to other portions of a structure. For instance, an interface region can be formed of material that cures with heat, with other portions of a common structure being formed with material that cures under ultraviolet light, or at different temperatures. By withholding application of heat (or heat to a level that causes curing) until a joining process, the interface region can be maintained in a curable state.

In the context of use with resins, a curable resin interface refers to an interface having resin that, upon further application of energy (e.g., light and/or heat) will further cross-link with other resin in the interface and/or with resin in an object with which the interface is in contact. A cured resin interface refers to an interface in which substantially all resin that is available to cross link with other resin, has cross-linked with resin in the interface and/or resin in such an object with which the interface is in contact. Similarly in the context of polymers, a curable (e.g., uncured or partially cured) interface refers to an interface having polymers that, upon further activation of energy such as noted above, exhibit chains that cross-link with other polymer chains in the interface and/or polymer chains in an object with which the interface is in contact. Where UV curing is used, an interface in a curable state refers to an interface having material that exhibits a photochemical reaction that causes cross-linking.

A cured interface may thus refer to one in which substantially all material in the interface is cured, and would not exhibit further meaningful bonding (e.g., cross-linking) with an object with which the interface is placed in contact after the curing. Accordingly, while a small amount of uncured material may be present in an interface that is co-cured with an interface of another object and therein bonded thereto, such an interface is referred to as a cured interface. In these contexts, while resins or polymers that are not cross-linked may remain in a cured interface, such resins or polymers may not be positioned relative to other polymers/resins with which to cross-link (e.g., absent diffusion).

In connection with one or more embodiments, fiber-reinforced composite (FRC) structures of various sizes are joined to each other, or to other components or materials, by forming and partially curing a three-dimensional curable material, and curing an interface region of the curable material with a FRC structure. Such an approach may be useful, for example, for joining a three-dimensional structure with a fiber reinforced prepreg (fiber impregnated with resin). This may involve, for instance, curing resin in the prepreg with uncured resin (or other material) in a three-dimensional structure.

Various embodiments are directed toward forming a three-dimensional adhesive component in a curable state. The adhesive component is formed continuously with three-dimensional structural features that form a joint with the adhesive component. Upon curing the curable structures, objects interfaced therewith are bonded to the three-dimensional structural features, which may act as a joint. Accordingly, various embodiments are directed toward a pre-shaped adhesive structure, which may be 3D-printed and that, when cured, bonds to whatever object it is in contact with.

In some embodiments, a joining material is created in a 3D printing process as follows. A continuous liquid interface process is used to form a rigid, curable, three-dimensional structure. The three-dimensional structure can be formed with complex internal structures, which may include one or more of a lattice, honeycomb, flow channel, or other structure amenable to forming via 3D printing, which may facilitate such formation as otherwise difficult or not possible (e.g., with three-dimensional structures that are otherwise inaccessible within exterior walls of a continuous material). The three-dimensional structure may include features that improve joint performance, such as drafts and fillets, which can reduce stress concentrations, and/or features that act as assembly aids such as marks and grooves. Further, such a joint structure can be formed with other joint enhancements, such as threaded openings, mechanical engaging and/or locking structures, and others that may facilitate joining, alignment or other manipulation of components. Such threaded openings and other structures formed as noted herein, such as via 3D printing, can be used to eliminate the need to drill into or otherwise penetrate or alter the joint, which could result in reducing integrity therein. For general information regarding the formation of three-dimensional objects and/or 3D printing, and for specific information regarding a continuous liquid interface process as may be implemented in accordance with one or more embodiments, reference may be made to U.S. Pat. No. 9,205,601, which is fully incorporated herein by reference. For instance, the approaches characterized in forming a three-dimensional object using a liquid interface involving a polymerizable liquid, and irradiating the liquid to form a solid polymer can be used to form a structure as noted herein with a curable interface.

Once formed and partially cured, the three-dimensional structure can be positioned in contact with another object and/or between joining partners (objects), and cured to form a joint. This may, for example, involve co-curing of adjoining interfaces, which may be carried out inside of an oven, autoclave or heated enclosure, such as within a bagged vacuum set-up. A permanent joint is thus formed between the components.

In some implementations, material of the 3D printed part is matched with material, such as resin, of the object to which it is joined to facilitate the formation of a mechanical and/or chemical bond. Such an approach may, for example, involve bonding the 3D printed part to a fiber-reinforced prepreg (fiber impregnated with resin) and forming a chemical bond therewith. Such an approach may address issues such as those noted above, including those in instances involving the use of adhesive with cured FRC.

As noted above, various embodiments may involve forming a chemical bond between a curable interface of a joint structure and one or more objects. This may be achieved by curing joining partners and joining material (of a 3D printed joint), which facilitates feature integration with customizable/complex geometries. These approaches may increase strength, reduce weight, and make manufacturing faster and easier. One such approach involves forming a lattice or honeycomb core for desirable mechanical properties of composites. Utilizing 3D printing, complex lattices with varying geometries and densities can be customized and created in the structure, which can provide desired performance.

Three-dimensional objects may be formed by arranging a curable material in a three-dimensional structural form using one or more of a variety of approaches, to suit various embodiments. The three-dimensional object has an interface region with the curable material in a curable state, and which can be positioned in contact with a joinable member and joined therewith via curing to form a bond, such as a chemical and/or mechanical bond. In various embodiments, the three-dimensional object is provided in the curable state by partially curing the three-dimensional structural object, which may be cured during bonding.

The material of the interface region may be matched or otherwise chosen relative to the joinable member, to form a desirable bond. For instance, the interface region may be formed with curable material including a resin that matches a resin in the joinable member, and the matching resins can be cured to form a bond that joins the three-dimensional object to the joinable member. The joinable member may include a similar interface that is co-cured while in contact with the interface of the three-dimensional object to form the bond. Co-curing in this regard may include forming a continuous joint including cured material from both the interface region of the three-dimensional object and the interface region of the joinable member, and/or may involve forming a chemical bond.

Three-dimensional objects as characterized herein may be bonded to one or more of a multitude of objects, to suit particular embodiments. In some embodiments, a three-dimensional object is formed with two or more interface regions, each having curable material in a curable state. The interface regions can be positioned in contact with respective joinable members, and joined to the joinable members by curing the second interface region. In this context, the three-dimensional object may be utilized as a joint between the joinable members and permanently affix the joinable members relative to one another. Further, by 3D-printing the joint in a curable state, the joint can be formed with intricate features that facilitate structural integrity, and can be coupled to the joinable members using the curing/bonding approach characterized herein to provide a robust apparatus that is readily manufactured.

A multitude of different types of objects can be bonded to three-dimensional joints as characterized here. Metal, plastic, composite, ceramic and other materials can be joined using approaches characterized herein. One or both interfaces between the three-dimensional joints and objects can be tailored to facilitate bonding. For instance, surface preparations can be made to facilitate bonding, such as by treating one or both surfaces with a chemical. Alignment and/or assembly features can be formed (e.g., 3D-printed) to ensure alignment prior to curing, such as by forming tabs or other structural components that align with corresponding components in the other piece (joint or object). Surface features can be formed at the interface to promote flow or other activity during curing (and bonding). In addition, material of the interface can be selected to provide desirable chemical bonding characteristics. Mechanical engagement features, such as barbs, can be formed on the interface surface. For general information regarding 3D printing, and for specific examples of mechanical features that may be formed, reference may be made to Tumbleston, et al., "Continuous Liquid Interface Production of 3D Objects," Science, Vol. 347, Issue 6228 (Mar. 20, 2015), which is incorporated herein by reference.

More specific embodiments involve 3D-printing a three-dimensional joint and/or a joint that is printed as such, as may be implemented in accordance with the above. For instance, the three-dimensional object can be formed by 3D-printing the curable material with three-dimensional internal structures, within exterior walls of the three-dimensional object. The 3D-printed object may be partially cured, with the interface region of the curable material in a curable state. Such approaches may involve one or more of vat photopolymerization, material jetting, use of multiple nozzles, direct writing, material extrusion, continuous fiber material extrusion, continuous liquid interface printing, and a combination thereof.

In a particular embodiment, a 3D-printed three-dimensional joint including an interface region having a curable material in a curable state, is positioned to contact the interface with a joinable member. A bond that joins the three-dimensional object to the joinable member is formed by curing the interface, such as by forming a chemical or mechanical bond. In some embodiments, the 3D-printed three-dimensional joint is provided, and in others is formed by partially curing the three-dimensional joint, prior to forming the bond. The partially cured joint may include fully cured portions with a curable interface for bonding, and may involve three-dimensional joint members (e.g., inner lattices or honeycomb structures) that are partially cured until final curing in conjunction with curing of the interface. The interface region may be formed with a chemical composition that, when cured while in contact with a joinable member, forms a chemical bond with the joinable member. The chemical composition of the interface may be the same as, or different than, material in other portions of the three-dimensional joint. For instance, structural components may be formed with a material desirable for providing strength and other characteristics relative to structures, while an interface material may be provided for compatibility with an object to which the structure is to be adhered, and/or to environmental conditions to which the structure may be exposed (e.g., with an outer surface material protecting inner structural components). Where resins are used, different resins can be employed in different areas. In various implementations, internal three-dimensional structures may be 3D-printed within an external wall and in a curable state, and later cured during bonding of the interface region.

In some implementations, respective materials may be joined/bonded together in a curable state. For instance, multiple three-dimensional structures can be formed and joined together in a curable state (e.g., not cured at all, or partially cured). An interface region of one or more of the structures as characterized herein can be later cured (e.g., cured further, or fully cured), to form a bond between the structures or between the structure and another object.

Turning now to the Figures, FIG. 1 shows a method, as may be implemented in accordance with one or more embodiments. At block 100, a three-dimensional structure is provided, with a curable interface region. This may be carried out, for example, by 3D-printing the object, including the interface region, and partially curing the interface region (and where desired, the entire object). In this context, the object may be a structured adhesive material, for facilitating coupling between respective members. Partially curing may involve one or more of a variety of approaches as characterized herein. By way of example, this may involve actively interrupting a curing process as noted at 101, using different energy types (such as types of light, heat) at block 102, using materials having different cure rates for certain regions as at block 103, or using materials that cure at different temperatures such as noted at block 104.

At block 110, the three-dimensional structure is positioned with the interface region contacting one or more joinable members. For instance, where the three-dimensional structure is a joint, the joint may be positioned in contact with a joinable member with which the joint is to be bonded, or in contact with two joinable members with the joint bonding the respective members together. Once positioned, the interface region is joined to a joinable member at block 120 by curing the interface region. This curing may involve, for example, causing a chemical bond between the joinable member and the interface region and/or forming a mechanical bond. In some instances, the joinable member also includes curable material that is joined to the interface region during a co-curing process.

Figure 2A:
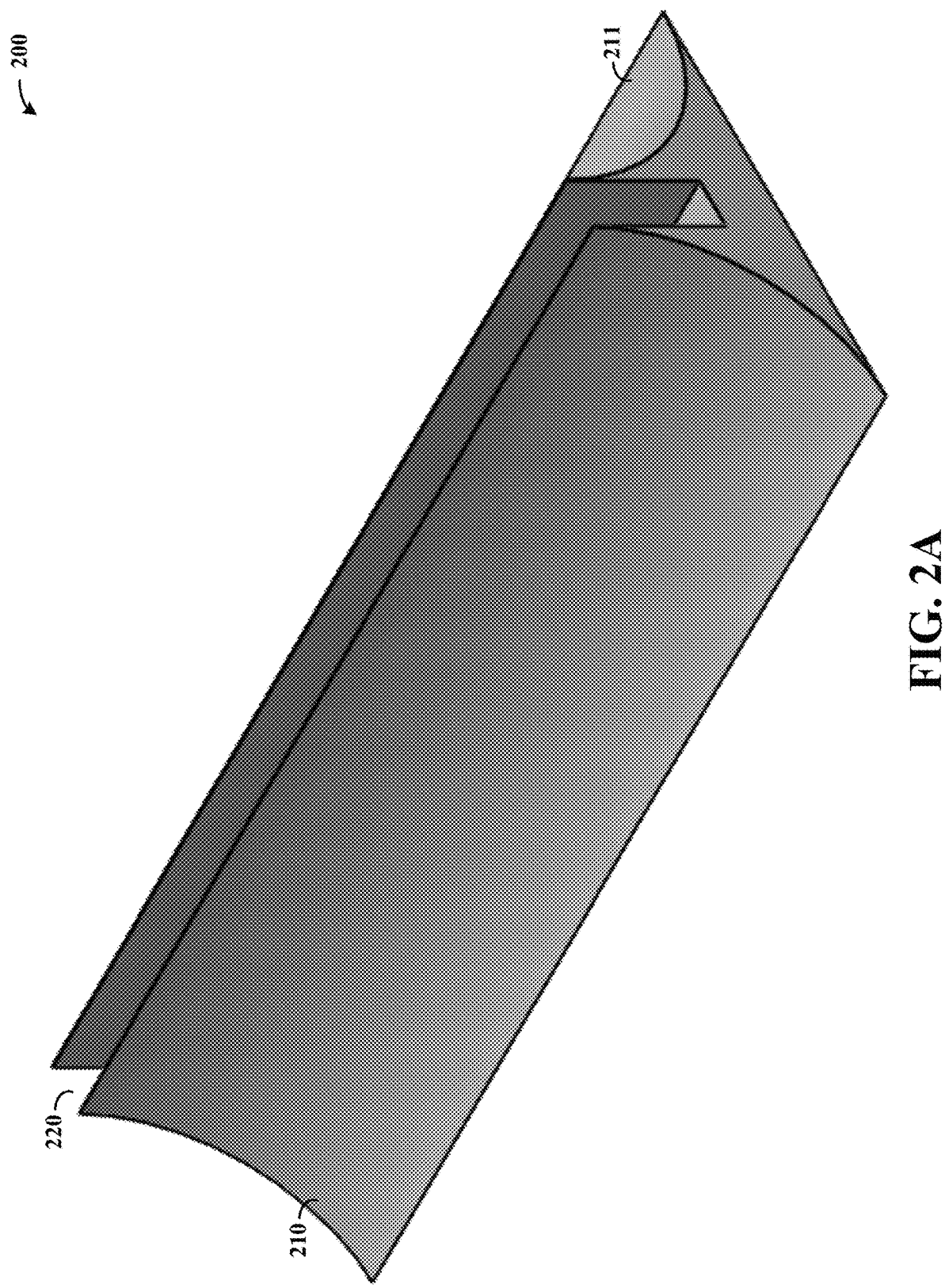
FIGS. 2A-2C show perspective, top and end views of an apparatus, in accordance with another example embodiment.
Figure 2B:
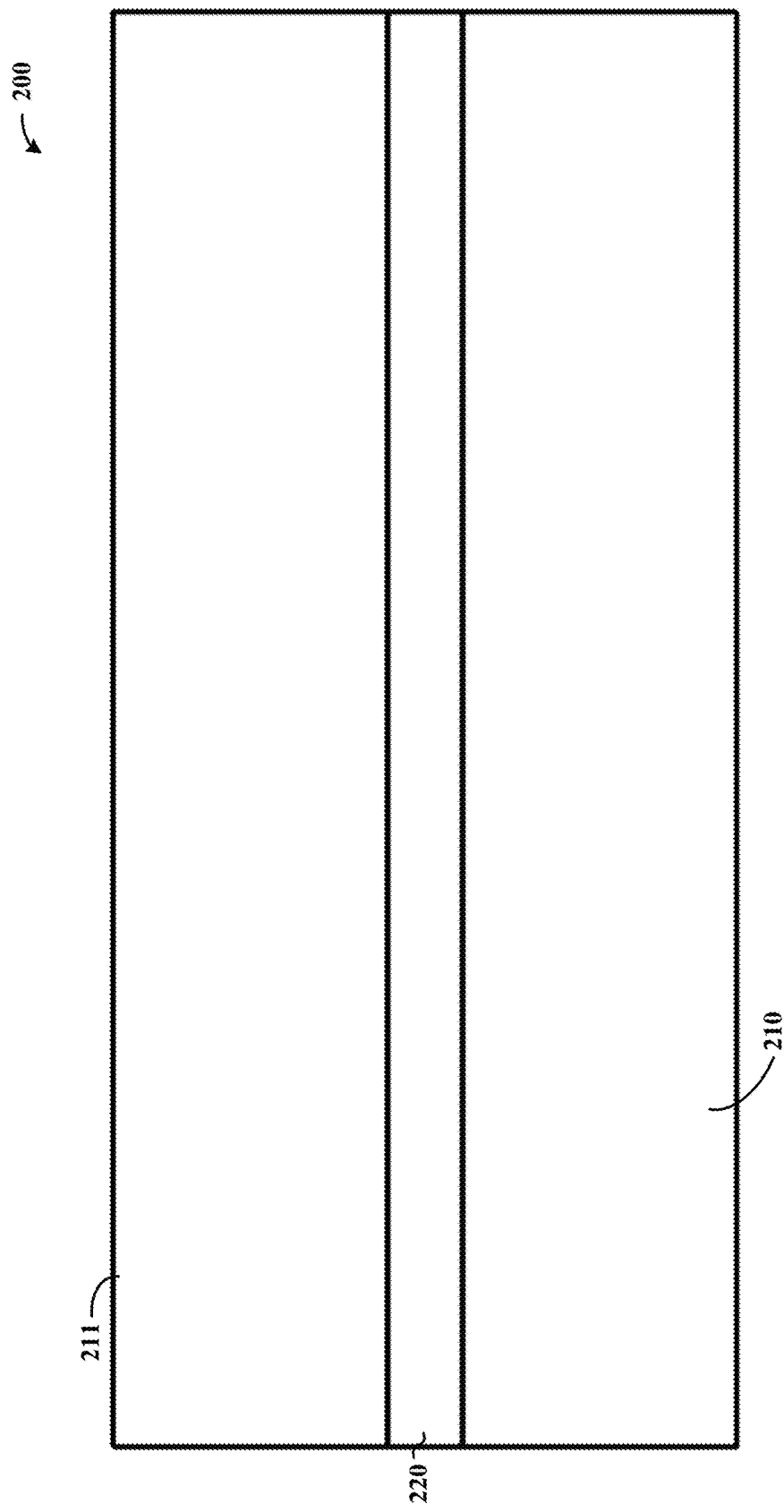
Figure 2C:
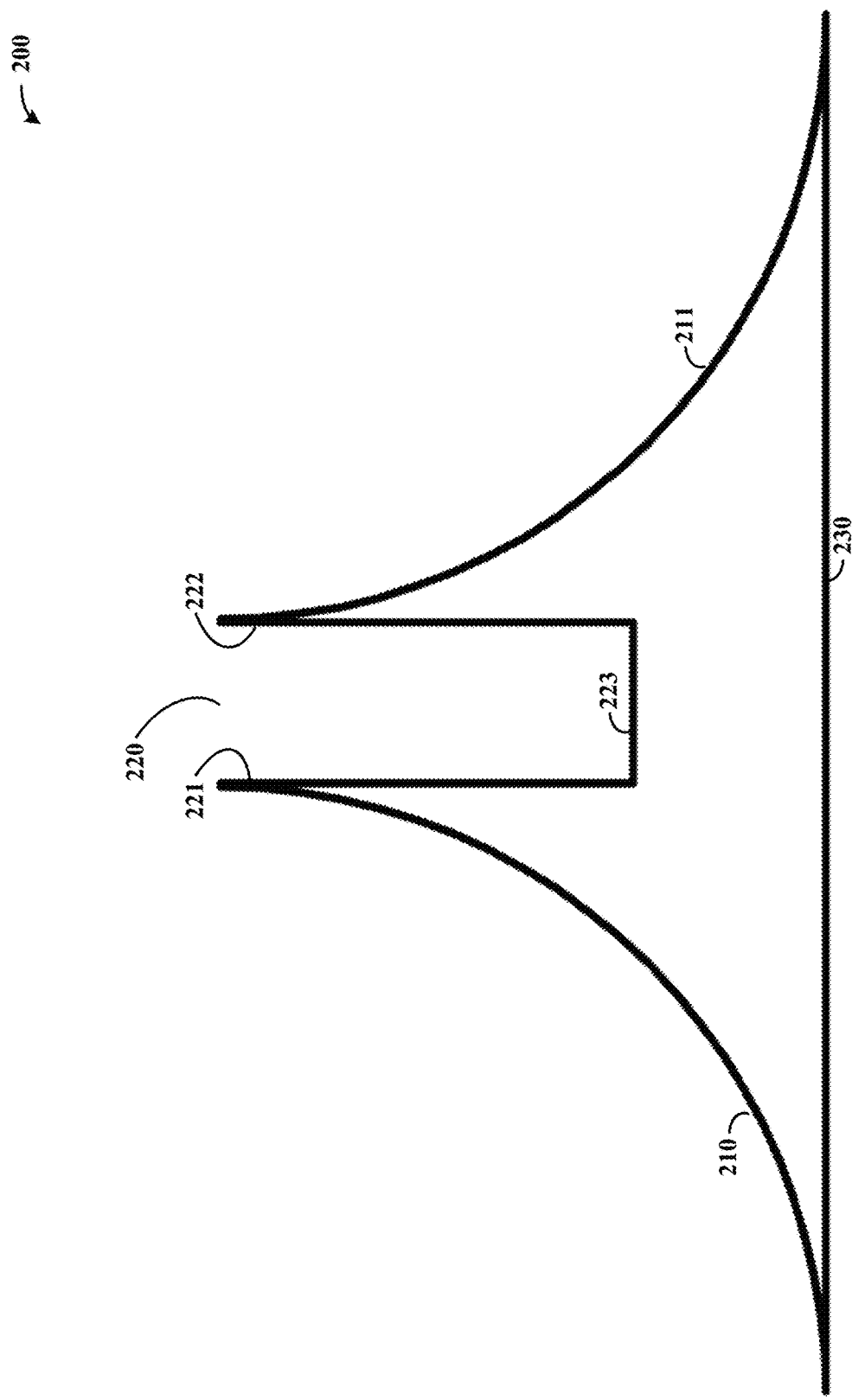

A multitude of different three-dimensional objects may be formed and/or implemented in accordance with one or more of a variety of embodiments. FIGS. 2A-2C show perspective, top and end views of an example such apparatus 200, as may be formed and/or implemented in accordance with one or more embodiments. The apparatus 200 has respective curved support structures 210 and 211 with a slot region 220 therebetween. The slot region 220 may be implemented with a curable material that is uncured or partially cured, for subsequent bonding to another object. For instance, referring to FIG. 2C, sidewalls 221 and 222, as well as bottom portion 223, can be provided in a curable state. Such a state may be provided by 3D-printing the apparatus 200, with the structural form as shown, and partially curing the apparatus.

Bonding can be carried out with one or more of a variety of objects. For instance, a planar object (or a planar protrusion from an object) may be inserted into the slot 220, and the apparatus 200 can be cured to bond inner sidewalls 221 and 222, as well as bottom portion 223, with the object. Further bonding may be carried out on other surfaces as well. For instance, referring to FIG. 2C again, if bottom surface 230 is formed in a curable state, it can be bonded to a surface of a planar material. In these respective examples, bonding may be carried out in a variety of manners, on a variety of surfaces.

Figure 3A:
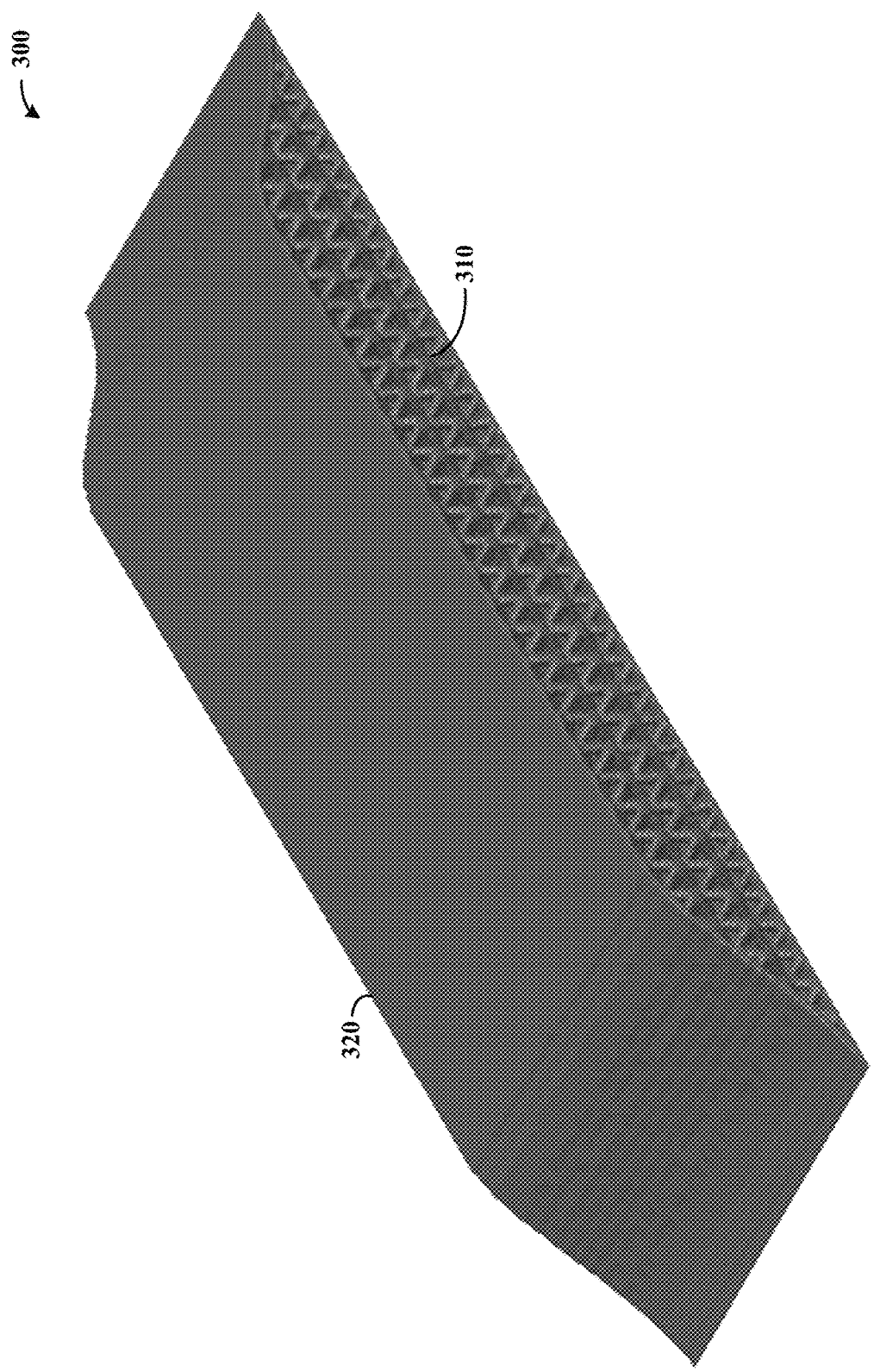
FIGS. 3A-3B show perspective and side views of another apparatus, in accordance with another example embodiment.
Figure 3B:
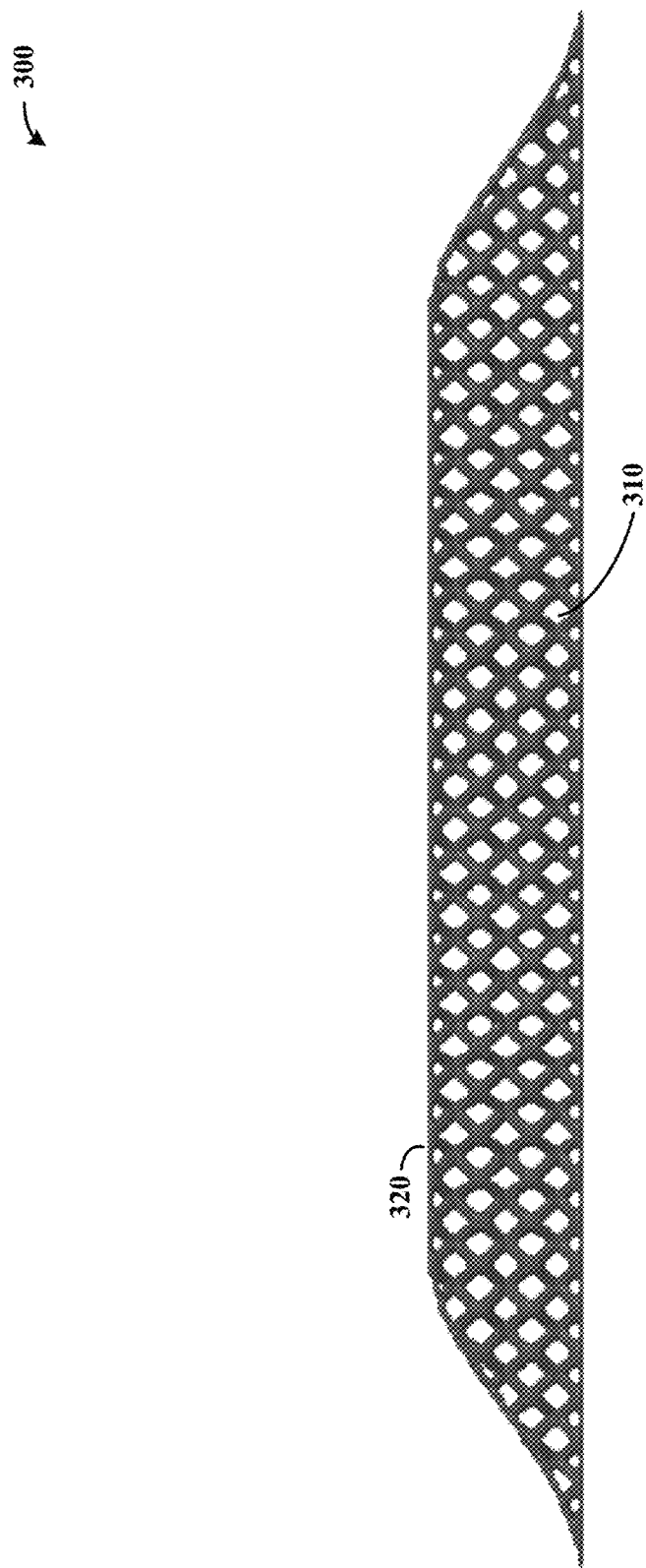

FIGS. 3A-3B show perspective and side views of another apparatus 300, as may be formed and/or implemented in accordance with one or more example embodiments. The apparatus 300 has a lattice type three-dimensional internal structure 310, and an interface region 320. The interface region 320, and in various instances the internal structure 310, are provided in a curable state, with the interface region 320 later cured to form a bond with another object.

In certain embodiments, the interface region 320 includes a layer of material, such as prepreg material, which can be provided in contact with uncured top surface regions of the lattice material 310. Upon curing, the layer bonds to the top surface regions. Such an approach can be carried out, for example by matching a resin or other substance used to form the three-dimensional internal structure 310 with material within the layer, such that an ensuring curing (e.g., via heat) causes a chemical reaction and/or otherwise forms a mechanical bond between the top surface regions and the layer of material.

Based upon the above discussion and illustrations, those skilled in the art will readily recognize that various modifications and changes may be made to the various embodiments without strictly following the exemplary embodiments and applications illustrated and described herein. For example, a variety of different shaped structures can be formed, with a variety of different interfaces. Such structures can be coupled with one, two or more objects. The resulting componentry can be utilized in a variety of industries, such as in the aerospace, automotive, and sports and recreation industries. Further, a variety of different manufacturing techniques may be employed for building such structures. Different types of materials can be used to suit particular applications, such as using two or more types of resins. In addition, the various embodiments described herein may be combined in certain embodiments, and various aspects of individual embodiments may be implemented as separate embodiments. Such modifications do not depart from the true spirit and scope of various aspects of the invention, including aspects set forth in the claims.

What is claimed is:

1. A method comprising:
   forming a three-dimensional object by 3D-printing and partially curing a curable material in a three-dimensional structural form, the three-dimensional object including an interface region having the partially-cured curable material in a curable state;
   positioning the three-dimensional object with the interface region, in the curable state, in contact with a joinable member; and
   with the interface region in contact with the joinable member, joining the three-dimensional object to the joinable member by curing the interface region.

2. The method of claim 1, wherein curing the interface region includes forming a chemical bond between the interface region of the three-dimensional object and the joinable member.

3. The method of claim 1, wherein curing the interface region includes forming a mechanical bond between the interface region of the three-dimensional object and the joinable member.

4. The method of claim 1, wherein forming the three-dimensional object includes forming the curable material as three-dimensional internal structures within exterior walls of the three-dimensional object, by 3D-printing the curable material.

5. The method of claim 1, wherein
   forming the three-dimensional object includes forming the interface region with the curable material including at least one resin that is compatible with a resin in the joinable member, and
   joining the three-dimensional object to the joinable member includes using the compatible resins to form a bond that joins the three-dimensional object to the joinable member.

6. The method of claim 1, wherein
   forming the three-dimensional object includes fully curing a portion of the curable material and partially curing another portion of the curable material at the interface, therein providing a rigid 3D structure with a curable interface; and
   joining the three-dimensional object to the joinable member includes co-curing the interface region of the three-dimensional object with an interface region of the joinable member that is also in a curable state.

7. The method of claim 6, wherein co-curing the interface region of the three-dimensional object with the interface region of the joinable member includes forming a continuous joint including cured material from both the interface region of the three-dimensional object and the interface region of the joinable member.

8. The method of claim 6, wherein co-curing the interface region of the three-dimensional object with the interface region of the joinable member includes forming a chemical bond between the interface region of the three-dimensional object and the interface region of the joinable member.

9. The method of claim 1, wherein forming a three-dimensional object includes arranging the curable material in the three-dimensional structural form and partially curing the curable material, therein 3D-printing the three-dimensional object with the interface region of the curable material in a curable state.

10. The method of claim 1, wherein arranging the curable material includes arranging the curable material using a process selected from the group of: vat photopolymerization, material jetting, direct write, material extrusion, continuous fiber material extrusion, continuous fiber additive manufacturing and a combination thereof.

11. The method of claim 1, wherein:
forming the three-dimensional object includes forming the three-dimensional object with a second interface region having the curable material in a curable state;
positioning the three-dimensional object includes positioning the second interface region in contact with a second joinable member; and
joining the three-dimensional object to the joinable member includes curing the second interface region with the second interface region in contact with the second joinable member, therein joining the joinable members to one another with the three-dimensional object acting as a joint between the joinable members and permanently affixing the joinable members relative to one another via the joint.

12. The method of claim 1, wherein:
arranging the curable material in the three-dimensional structural form includes partially curing the three-dimensional structural form and therein providing the interface region having the curable material in the curable state, and
curing the interface region includes curing the three-dimensional object.

13. A method comprising:
3D-printing a three-dimensional joint having an interface region including a curable material, by partially curing the curable material;
positioning the three-dimensional joint with the interface region in contact with a joinable member; and
forming a bond that joins the three-dimensional joint to the joinable member by curing the interface region.

14. The method of claim 13, wherein forming the bond includes at least one of forming a chemical bond and forming a mechanical bond.

15. The method of claim 13, wherein partially curing the three-dimensional joint includes carrying out a step selected from the group of: actively interrupting curing of the curable material, using different energy types to partially cure the curable material, 3D printing the curable material with respective materials having different cure rates at different regions of the three-dimensional joint, 3D printing the curable material with respective materials that cure at different temperatures, and a combination thereof.

16. The method of claim 13, wherein 3D-printing the three-dimensional joint includes providing the three-dimensional joint in a curable state, further including curing three-dimensional structures of the three-dimensional joint while curing the interface region.

17. The method of claim 13, wherein 3D-printing the three-dimensional joint includes printing three-dimensional adhesive material that is further curable at the interface region, the adhesive material having a chemical composition that, when cured while in contact with the joinable member, forms a chemical bond with the joinable member.

18. The method of claim 13, wherein 3D-printing the three-dimensional joint includes forming internal three-dimensional structures within an external wall in a curable state, further including curing the three-dimensional structures while curing the interface region.

* * * * *